E. H. CAMFIELD.
AIR SIGNAL.
APPLICATION FILED MAY 12, 1921.
1,412,099.
Patented Apr. 11, 1922.
2 SHEETS—SHEET 1.
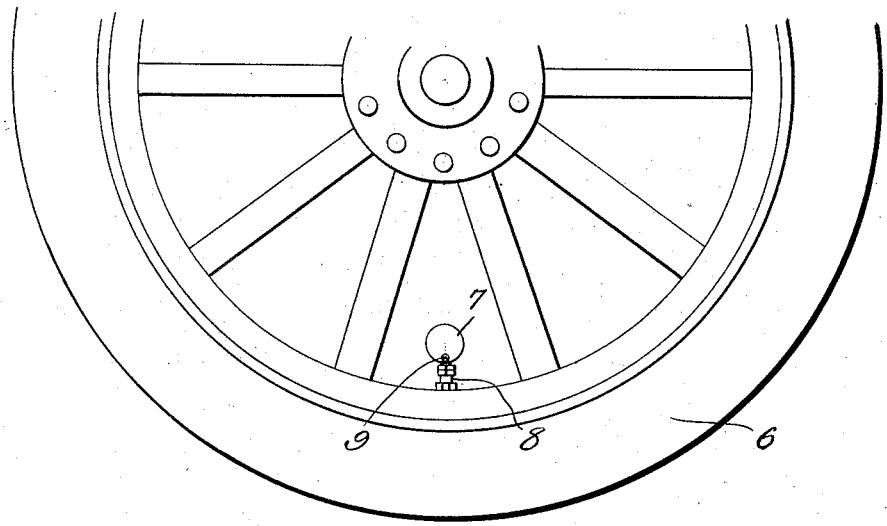
Fig.1.
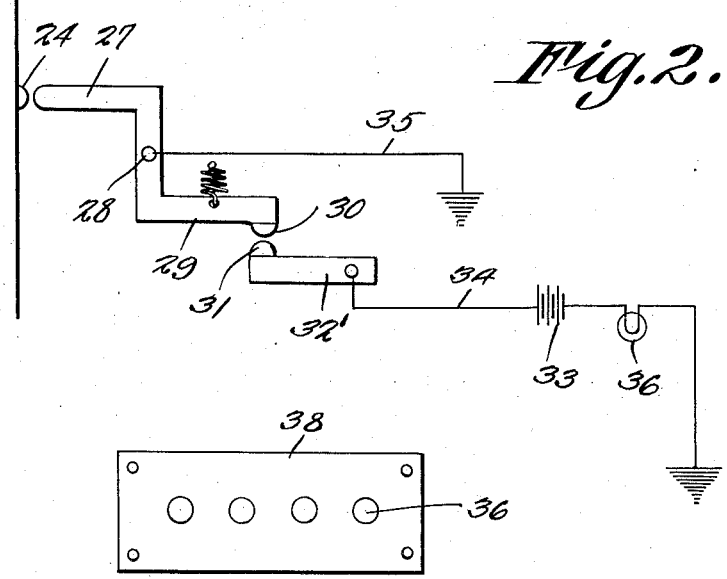
Fig.2.
Fig.3.
Inventor
E. H. Camfield
By C. A. Snow & Co.
Attorneys

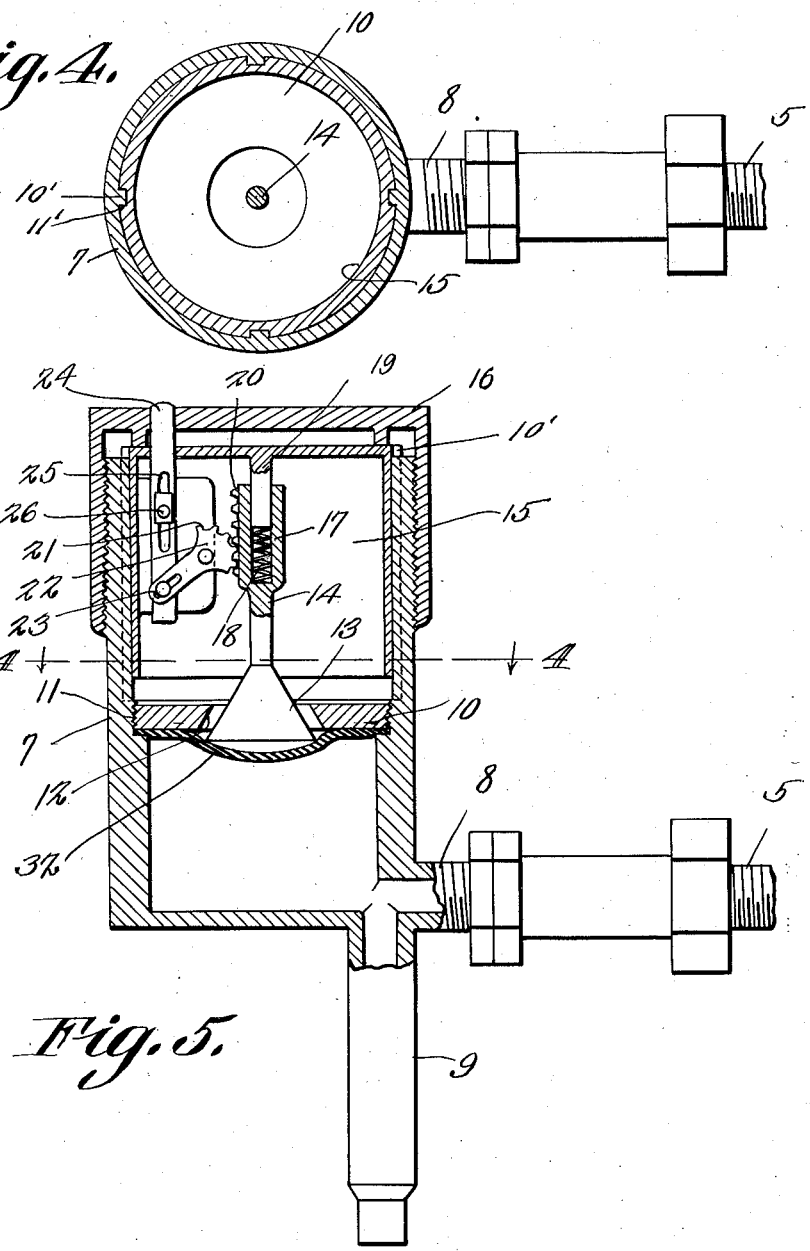

UNITED STATES PATENT OFFICE.

EARTHEN H. CAMFIELD, OF FLORENCE, COLORADO, ASSIGNOR OF ONE-HALF TO
J. VICTOR McCANDLESS, OF FLORENCE, COLORADO.

AIR SIGNAL.

1,412,099.   Specification of Letters Patent.   Patented Apr. 11, 1922.

Application filed May 12, 1921. Serial No. 468,883.

*To all whom it may concern:*

Be it known that I, EARTHEN H. CAMFIELD, a citizen of the United States, residing at Florence, in the county of Fremont and State of Colorado, have invented a new and useful Air Signal, of which the following is a specification.

This invention relates to signaling devices, and more particularly to an electric signal adapted for use in connection with pneumatic tires to indicate when the same have become deflated.

The primary object of the invention is to provide a device of this character which will be controlled by the air pressure within the tire, there being provided suitable means carried by the tire, and adapted to contact with a switch mechanism adjacent to the wheel on which the tire is supported, for completing a circuit.

A further object of the invention is to provide a device which may be positioned on the usual valve stem and one which will not interfere with the inflating of the tire.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a fragmental elevational view of a wheel and tire, showing the invention as applied.

Figure 2 is a diagrammatical view of the invention disclosing in detail the switch arm.

Figure 3 is a plan view of the lamp supporting plate, which is attached to the instrument board of a vehicle.

Figure 4 is a sectional view taken on line 4—4 of Figure 5.

Figure 5 is a vertical sectional view through the body portion or casing of the device.

Referring to the drawings in detail, the device is shown as applied to the valve stem 5 of a pneumatic tire, the tire being indicated at 6 and disclosed more particularly by Figure 1 of the drawings.

The casing or body portion of the device is indicated by the reference character 7 and as shown, is circular in cross section, the casing being in communication with the valve stem 5, as through the pipe 8, there being provided an inlet pipe 9 adapted to receive a nozzle of a pipe in communication with a suitable air supply not shown, whereby the tire associated with the device may be inflated.

Disposed within the casing 7 is an adjustable partitioning wall 10 which is threaded on its periphery to cooperate with the threads 11 formed on the interior of the casing, so that the partitioning wall 10 may be moved within the casing. An opening is formed substantially centrally of the partitioning wall 10, and as shown the walls of the opening are inclined as at 12, to conform to the taper of the valve member 13, which operates therein, the valve member being provided with a stem 14 by which the valve member is held in alignment with its seat.

Positioned within the casing 7 is a support 15 which has its inner end disposed adjacent to the partitioning wall 10, there being provided ribs 10' on the support 15 which are positioned in the grooves 11' of the casing for preventing rotary movement of the support 15. The support is held in position through the medium of the cap 16, which has a threaded portion to permit the same to be secured to the casing.

The valve stem 14 is provided with an enlarged hollow portion 17 designed to accommodate the coiled spring 18 which has one end thereof contacting with the inwardly extending pin 19, the opposite end thereof contacting with the end wall of the hollow portion 17, to normally urge the valve from its seat.

On the outer wall of the enlarged portion of the stem 14, are a plurality of teeth 20 which are in mesh with the teeth 21 of the segment 22 so that movement of the valve member will result in a relative movement of the segment 22, there being provided an arm 23 forming a part of the segment for attachment with the plunger 24 for moving the plunger. This plunger 24 is provided with an elongated opening 25, which accommodates the pin 26 to permit the plunger to reciprocate freely, but prevent lateral movement thereof. The plunger 24 moves through an opening in the cap 16 and has one end thereof extending beyond the cap to contact with the switch arm 27, which is mounted in a suitable location adjacent to the axle of a vehicle, and disposed in the path of travel of the plunger 24, when the same is in its extended position.

As shown, the switch arm 27 is pivoted as at 28 and has a right angled extremity 29 provided with a contact point 30, which cooperates with a contact point 31 formed on the plate 32′ the contact point 31 being in circuit with a source of electric supply 33 as through the wire 34, the circuit being grounded through the wire 35, which has connection with the switch arm 27 at its pivot point 28.

The switch member of the device is in circuit with the electric lamp 36, so that when the switch member is actuated to bring the contact points 30 and 31 into contact, a circuit will be completed to the lamp to cause the same to illuminate, thereby indicating to the operator a certain condition, of the tire. A diaphragm indicated at 32 is positioned within the casing and contacts with the valve member 13, the air pressure within the casing being sufficient to force the valve member inwardly which causes the plunger 24 to be held in a position as indicated by Figure 5 of the drawings.

In the operation of the device, assuming that the device is positioned on the valve stem of a pneumatic tire, and the tire is inflated to a predetermined degree to cause the plunger 24 to be held to the limit of its inward movement. If the pressure on the diaphragm 32 is released, due to the tire becoming deflated, the spring member 18 will overcome the air pressure on the valve 13 and move the same outwardly with the result that the plunger 24 is moved from the casing, and contacts with the switch arm 27. Since the switch arm is pivotally supported, it is obvious that with each revolution of the wheel to which the tire is secured, the switch member will be caused to complete a circuit between the contact points 30 and 31 to cause the lighting of the lamp 36.

From the foregoing it will be seen that by adjusting the cap 16, the tension of the spring 18 may be regulated to control the movements of the member 13 to cause the same to operate under the various air pressures. In view of the foregoing the cap 16 is provided with a suitable indicator finger adapted to cooperate with suitable graduations on the body 7 of the device, whereupon the indicator may be moved to register with any predetermined marking thereon so that a predetermined tire pressure may be attained.

It might be further stated however that a lamp supporting plate as indicated at 38 is positioned on the instrument board of a vehicle, there being provided a lamp for each tire of the vehicle, so that when a certain tire is deflated, a lamp will be lighted to indicate the particular tire deflated.

Having thus described the invention, what is claimed as new is:—

In combination with the valve stem of a pneumatic tire, a signaling device including a casing, a partitioning member within the casing, a head supported by the partitioning member, said head having a stem, said stem having an enlarged hollow portion, a support positioned within the casing, a pin carried by the support and extending into the hollow portion of the stem, means within the hollow portion of the stem and contacting with the pin for moving the head in one direction, a plunger movable within the casing and having one end thereof extending through the casing, means for imparting movement of the head and shank to the plunger, and a pressure operated diaphragm contacting with the head for moving the head and shank.

In testimony that I claim the foregoing as my own, I have hereto affixed my signature in the presence of two witnesses.

EARTHEN H. CAMFIELD.

Witnesses:
 FRANK A. SIKES,
 HERBERT MILLER.